(12) United States Patent
Bansal et al.

(10) Patent No.: US 9,406,075 B1
(45) Date of Patent: *Aug. 2, 2016

(54) SYSTEM AND METHOD FOR IMPROVING TUNING USING USER PROVIDED SATISFACTION SCORES

(71) Applicant: Convergys Customer Management Delaware LLC, Cincinnati, OH (US)

(72) Inventors: Dhananjay Bansal, Reston, VA (US); Nancy Gardner, Rockport, ME (US); John C. Georgesen, Maineville, OH (US); James H. Lythgoe, Mason, OH (US); Scott D. Spera, Cincinnati, OH (US)

(73) Assignee: Convergys Customer Management Deleware LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,806

(22) Filed: Jul. 10, 2013

Related U.S. Application Data

(63) Continuation of application No. 13/352,499, filed on Jan. 18, 2012, now Pat. No. 8,504,379, which is a continuation of application No. 12/338,064, filed on Dec. 18, 2008, now Pat. No. 8,126,723.

(60) Provisional application No. 61/014,771, filed on Dec. 19, 2007.

(51) Int. Cl.
*H04M 3/42* (2006.01)
*G06Q 30/02* (2012.01)

(52) U.S. Cl.
CPC .................................. *G06Q 30/0203* (2013.01)

(58) Field of Classification Search
CPC .. H04M 7/006; A01B 30/006; G06Q 30/0203
USPC ........................... 379/88.18, 210.01; 705/1.1
See application file for complete search history.

(56) References Cited

U.S. PATENT DOCUMENTS

| | | |
|---|---|---|
| 6,337,904 B1 | 1/2002 | Gisby |
| 6,405,170 B1 | 6/2002 | Phillips et al. |
| 6,665,644 B1 | 12/2003 | Kanevskey et al. |
| 6,701,514 B1 | 3/2004 | Haswell et al. |
| 6,798,876 B1 | 9/2004 | Bala |
| 6,810,111 B1 | 10/2004 | Hunter et al. |
| 7,069,231 B1 | 6/2006 | Cinarkaya et al. |

(Continued)

OTHER PUBLICATIONS

Office Action dated Jun. 1, 2012 for U.S. Appl. No. 11/686,812.

(Continued)

*Primary Examiner* — Simon King
(74) *Attorney, Agent, or Firm* — Crowe & Dunlevy, A Professional Corporation

(57) ABSTRACT

A system and method provide a way of improving customer satisfaction with a customer service application by identifying tuning opportunities based on customer satisfaction scores. The system and method compare portions of the customer service application to a customer satisfaction score obtained from a customer satisfaction survey. The comparisons show, statistically, which portions of the customer service application correlate to a low customer satisfaction score. A report is produced which identifies these areas that correlate to low customer satisfaction, and these areas may be tuned to improve customer satisfaction with the customer service application.

16 Claims, 11 Drawing Sheets

(56) References Cited

U.S. PATENT DOCUMENTS

| | | |
|---|---|---|
| 7,599,861 B2 | 10/2009 | Peterson |
| 7,673,340 B1 | 3/2010 | Cohen et al. |
| 7,787,601 B2 | 8/2010 | Bittner |
| 7,899,732 B2 | 3/2011 | Van Beaumont et al. |
| 8,091,117 B2 | 1/2012 | Williams et al. |
| 2002/0184082 A1* | 12/2002 | Nakano ............... G06Q 10/06 705/7.41 |
| 2004/0122941 A1 | 6/2004 | Creamer et al. |
| 2004/0230438 A1* | 11/2004 | Pasquale ............. G06Q 30/016 705/304 |
| 2004/0264672 A1 | 12/2004 | Paek et al. |
| 2005/0144023 A1 | 6/2005 | Aboujaoude et al. |
| 2006/0026049 A1 | 2/2006 | Joseph et al. |
| 2006/0161470 A1 | 7/2006 | Smith et al. |
| 2007/0140466 A1 | 6/2007 | Sharma |
| 2007/0208579 A1 | 9/2007 | Peterson |
| 2008/0071533 A1 | 3/2008 | Cave et al. |
| 2008/0089493 A1 | 4/2008 | Booten |
| 2009/0006083 A1 | 1/2009 | Bachand |
| 2012/0017261 A1 | 1/2012 | Lim |

OTHER PUBLICATIONS

Levin, G "Capture The Customer Experience by Tapping IVR," http://www.callcentermagazine.com/showArticle.ihtml?articleID=197000129 (Feb. 1, 2007).

Levin, G "Measuring the Things That Matter," http://www.callcentermagazine.com/showArticle.ihtml?articleID=197005851 (Mar. 1, 2007).

Support Overview > IVR Application Monitoring http://voxeo.com/support/ivr-monitoring.isp Oct. 16, 2007 pp. 1-2.

Ultra IntelliFind Advanced Speech Analytics, A Verint Systems Technical Brief, Verint Powering Actionable Intelligence, Verint Systems, Inc. (Sep. 2005) pp. 1-17.

Office Action dated Jul. 9, 2009 for U.S. Appl. No. 11/686,812.

Office Action dated Jan. 13, 2010 for U.S. Appl. No. 11/686,812.

Office Action dated Oct. 17, 2011 for U.S. Appl. No. 11/686,812.

U.S. Appl. No. 11/686,812, filed Mar. 15, 2007 (Irwin et al.).

* cited by examiner

```
TIME=20070731115433494938|CHAN=11|EVNT=SWlclst|ANII=xxxxxxxxx|DNIS=xxx
...
TIME=20070731115433525235|CHAN=11|EVNT=SWldmst|DMTP=CUST|DMNM=M0400
TIME=20070731115433525235|CHAN=11|EVNT=SWlstst|ROLE=Collection|LPNM=Initial
TIME=20070731115433525235|CHAN=11|EVNT=SWlprst|PRNM=INITIAL_PROMPT|PRTX=m0400_initial.ulaw
TIME=20070731115434349235|CHAN=11|EVNT=SWlendp|BRGN=0|BTIM=192
TIME=20070731115434349266|CHAN=11|EVNT=SWlstnd|RDEC=accept|MODE=SPCH
TIME=20070731115434349266|CHAN=11|EVNT=SWldmnd|TSTT=Success|TRTT=open_24_hours
...
TIME=20070731115444179937|CHAN=11|EVNT=SWldmst|DMTP=CUST|DMNM=M0280
TIME=20070731115444179937|CHAN=11|EVNT=SWlstst|ROLE=Collection|LPNM=Initial
TIME=20070731115444179937|CHAN=11|EVNT=SWlprst|PRNM=INITIAL_PROMPT|PRTX=m0280_location_selection_d.ulaw
TIME=20070731115444247118|CHAN=11|EVNT=SWlstop|MODE=Timeout
TIME=20070731115444247150|CHAN=11|EVNT=SWlprst|PRNM=FAILUREPROMPT|PRTX=
TIME=20070731115444247150|CHAN=11|EVNT=SWldmnd|TSTT=Max timeouts|TRTT=
...
TIME=20070731115445233358|CHAN=11|EVNT=SWldmst|DMTP=CUST|DMNM=M0440
TIME=20070731115445233374|CHAN=11|EVNT=SWlprst|PRNM=INITIAL_PROMPT|PRTX=m0440_survey_initial.ulaw
TIME=20070731115445551295|CHAN=11|EVNT=SWlendp|BRGN=1|BTIM=192
TIME=20070731115445551326|CHAN=11|EVNT=SWlstnd|RDEC=accept|MODE=SPCH
TIME=20070731115445551326|CHAN=11|EVNT=SWldmnd|TSTT=Success|TRTT=survey
...
TIME=20070731115446237784|CHAN=11|EVNT=SWlclnd
```

```
TIME=20070731154602296|CHAN=10|EVNT=SW|clst|ANI|=xxxxxxxxx|DNIS=xxxx
TIME=20070731154602296|CHAN=10|EVNT=SW|svst|SVNM=POSE|CLNT=<Company>|PROJ=POSE
TIME=20070731154706623|CHAN=10|EVNT=SW|dmst|DMTP=CUST|DMNM=A100_Quality
TIME=20070731154706623|CHAN=10|EVNT=SW|stst|ROLE=Collection|LPNM=Initial
TIME=20070731154706716|CHAN=10|EVNT=SW|prst|PRNM=INITIAL_PROMPT|PRTX=A100_quality_a.ulaw
TIME=20070731154728466|CHAN=10|EVNT=SW|endp|BRGN=0|BTIM=192
TIME=20070731154728497|CHAN=10|EVNT=SW|stnd|RDEC=accept|MODE=SPCH
TIME=20070731154728513|CHAN=10|EVNT=SW|dmnd|TSTT=Success|TRTT=five
...
TIME=20070731154759669|CHAN=10|EVNT=SW|dmst|DMTP=CUST|DMNM=A100_Resolution_Navigation
TIME=20070731154759700|CHAN=10|EVNT=SW|stst|ROLE=Collection|LPNM=Initial
TIME=20070731154759731|CHAN=10|EVNT=SW|prst|PRNM=INITIAL_PROMPT|PRTX=A100_resolution_navigation_initial.ulaw
TIME=20070731154814543|CHAN=10|EVNT=SW|endp|BRGN=1|BTIM=3968
TIME=20070731154814637|CHAN=10|EVNT=SW|stnd|RDEC=confirm|MODE=SPCH
TIME=20070731154814637|CHAN=10|EVNT=SW|stst|ROLE=Confirmation|LPNM=Initial
TIME=20070731154814731|CHAN=10|EVNT=SW|prst|PRNM=CONFIRMATION_INITIALPROMPT|PRTX=you_said.ulaw
TIME=20070731154818137|CHAN=10|EVNT=SW|epst
TIME=20070731154819684|CHAN=10|EVNT=SW|endp|BRGN=0|BTIM=176
TIME=20070731154819684|CHAN=10|EVNT=SW|stnd|RDEC=accept|MODE=SPCH
TIME=20070731154819684|CHAN=10|EVNT=SW|tynd|DCSN=Denied|HYPO=two
TIME=20070731154819762|CHAN=10|EVNT=SW|prst|PRNM=wronganswerapologies1|PRTX=blank.ulaw
TIME=20070731154819762|CHAN=10|EVNT=SW|stst|ROLE=Collection|LPNM=Wronganswer1
TIME=20070731154819793|CHAN=10|EVNT=SW|prst|PRNM=reprompts1|PRTX=A100_resolution_navigation_r1.ulaw
TIME=20070731154823684|CHAN=10|EVNT=SW|endp|BRGN=0|BTIM=192
TIME=20070731154823731|CHAN=10|EVNT=SW|stnd|RDEC=accept|MODE=SPCH
TIME=20070731154823731|CHAN=10|EVNT=SW|tynd|DCSN=Accepted|HYPO=five
TIME=20070731154823731|CHAN=10|EVNT=SW|phnd|TSTT=Success|TRTT=five
TIME=20070731154823731|CHAN=10|EVNT=SW|dmnd|TSTT=Success|TRTT=five
...
TIME=20070731154824152|CHAN=10|EVNT=SW|dmst|DMTP=CUST|DMNM=A110_Front_End_Instructions
TIME=20070731154824152|CHAN=10|EVNT=SW|stst|ROLE=Collection|LPNM=Initial
TIME=20070731154824215|CHAN=10|EVNT=SW|prst|PRNM=INITIAL_PROMPT|PRTX=A110_front_end.ulaw
TIME=20070731154843746|CHAN=10|EVNT=SW|endp|BRGN=0|BTIM=192
TIME=20070731154843793|CHAN=10|EVNT=SW|stnd|RDEC=accept|MODE=SPCH
TIME=20070731154843793|CHAN=10|EVNT=SW|dmnd|TSTT=Success|TRTT=five
...
TIME=20070731155108635|CHAN=10|EVNT=SW|clnd
```

FIG. 8
109

```
TIME=20070731154334938|CHAN=11|EVNT=SWlclst|ANII=xxxxxxxxxx|DNIS=xxxx
...
TIME=20070731154335235|CHAN=11|EVNT=SWldmst|DMTP=CUST|DMNM=M0400
TIME=20070731154335235|CHAN=11|EVNT=SWlstst|ROLE=Collection|LPNM=Initial
TIME=20070731154335235|CHAN=11|EVNT=SWlprst|PRNM=INITIAL_PROMPT|PRTX=m0400_initial.ulaw
TIME=20070731154349235|CHAN=11|EVNT=SWlendp|BRGN=0|BTIM=192
TIME=20070731154349266|CHAN=11|EVNT=SWlstnd|RDEC=accept|MODE=SPCH
TIME=20070731154349266|CHAN=11|EVNT=SWldmnd|TSTT=Success|TRTT=open_24_hours
...
TIME=20070731154417937|CHAN=11|EVNT=SWldmst|DMTP=CUST|DMNM=M0280
TIME=20070731154417937|CHAN=11|EVNT=SWlstst|ROLE=Collection|LPNM=Initial
TIME=20070731154417937|CHAN=11|EVNT=SWlprst|PRNM=INITIAL_PROMPT|PRTX=m0280_location_selection_d.ulaw
TIME=20070731154424716|CHAN=11|EVNT=SWlstop|MODE=Timeout
TIME=20070731154424750|CHAN=11|EVNT=SWlprst|PRNM=FAILUREPROMPT|PRTX=
TIME=20070731154424750|CHAN=11|EVNT=SWldmnd|TSTT=Max timeouts|TRTT=
...
TIME=20070731154523358|CHAN=11|EVNT=SWldmst|DMTP=CUST|DMNM=M0440
TIME=20070731154523374|CHAN=11|EVNT=SWlprst|PRNM=INITIAL_PROMPT|PRTX=m0440_survey_initial.ulaw
TIME=20070731154551295|CHAN=11|EVNT=SWlendp|BRGN=1|BTIM=192
TIME=20070731154551326|CHAN=11|EVNT=SWlstnd|RDEC=accept|MODE=SPCH
TIME=20070731154551326|CHAN=11|EVNT=SWldmnd|TSTT=Success|TRTT=survey
...
TIME=20070731154602296|CHAN=10|EVNT=SWlsvst|SVNM=POSE|CLNT=<Company>|PROJ=POSE
TIME=20070731154706623|CHAN=10|EVNT=SWldmst|DMTP=CUST|DMNM=A100_Quality
TIME=20070731154706623|CHAN=10|EVNT=SWlstst|ROLE=Collection|LPNM=Initial
TIME=20070731154706716|CHAN=10|EVNT=SWlprst|PRNM=INITIAL_PROMPT|PRTX=A100_quality_a.ulaw
TIME=20070731154728466|CHAN=10|EVNT=SWlendp|BRGN=0|BTIM=192
TIME=20070731154728497|CHAN=10|EVNT=SWlstnd|RDEC=accept|MODE=SPCH
TIME=20070731154728513|CHAN=10|EVNT=SWldmnd|TSTT=Success|TRTT=five
...
TIME=20070731154759669|CHAN=10|EVNT=SWldmst|DMTP=CUST|DMNM=A100_Resolution_Navigation
TIME=20070731154759700|CHAN=10|EVNT=SWlstst|ROLE=Collection|LPNM=Initial
TIME=20070731154759731|CHAN=10|EVNT=SWlprst|PRNM=INITIAL_PROMPT|PRTX=A100_resolution_navigation_initial.ulaw
TIME=20070731154814543|CHAN=10|EVNT=SWlendp|BRGN=1|BTIM=3968
TIME=20070731154814637|CHAN=10|EVNT=SWlstnd|RDEC=confirm|MODE=SPCH
TIME=20070731154814637|CHAN=10|EVNT=SWlstst|ROLE=Confirmation|LPNM=Initial
TIME=20070731154814731|CHAN=10|EVNT=SWlprst|PRNM=CONFIRMATION_INITIALPROMPT|PRTX=you_said.ulaw
TIME=20070731154818137|CHAN=10|EVNT=SWlepst
TIME=20070731154819684|CHAN=10|EVNT=SWlendp|BRGN=0|BTIM=176
TIME=20070731154819684|CHAN=10|EVNT=SWlstnd|RDEC=accept|MODE=SPCH
TIME=20070731154819684|CHAN=10|EVNT=SWltynd|DCSN=Denied|HYPO=two
TIME=20070731154819762|CHAN=10|EVNT=SWlprst|PRNM=wronganswerapologies1|PRTX=blank.ulaw
TIME=20070731154819762|CHAN=10|EVNT=SWlstst|ROLE=Collection|LPNM=Wronganswer1
TIME=20070731154819793|CHAN=10|EVNT=SWlprst|PRNM=reprompts1|PRTX=A100_resolution_navigation_r1.ulaw
TIME=20070731154823684|CHAN=10|EVNT=SWlendp|BRGN=0|BTIM=192
TIME=20070731154823731|CHAN=10|EVNT=SWlstnd|RDEC=accept|MODE=SPCH
TIME=20070731154823731|CHAN=10|EVNT=SWltynd|DCSN=Accepted|HYPO=five
TIME=20070731154823731|CHAN=10|EVNT=SWlphnd|TSTT=Success|TRTT=five
TIME=20070731154823731|CHAN=10|EVNT=SWldmnd|TSTT=Success|TRTT=five
...
TIME=20070731154824152|CHAN=10|EVNT=SWldmst|DMTP=CUST|DMNM=A110_Front_End_Instructions
TIME=20070731154824152|CHAN=10|EVNT=SWlstst|ROLE=Collection|LPNM=Initial
TIME=20070731154824215|CHAN=10|EVNT=SWlprst|PRNM=INITIAL_PROMPT|PRTX=A110_front_end.ulaw
TIME=20070731154843746|CHAN=10|EVNT=SWlendp|BRGN=0|BTIM=192
TIME=20070731154843793|CHAN=10|EVNT=SWlstnd|RDEC=accept|MODE=SPCH
TIME=20070731154843793|CHAN=10|EVNT=SWldmnd|TSTT=Success|TRTT=five
...
TIME=20070731155108635|CHAN=10|EVNT=SWlclnd
```

FIG. 9

| Events | Call 1 | Call 2 | Call 3 | Call 4 | Call 5 | Call 6 | Call 7 | Call 8 | Call 9 | Call 10 | Call 11 | Call 12 | Call 13 | Call 14 | Call 15 | Call 16 | Call 17 | Call 18 | Call 19 | Call 20 |
|---|---|---|---|---|---|---|---|---|---|---|---|---|---|---|---|---|---|---|---|---|
| hl_a0210_present | 0 | 0 | 0 | 0 | 0 | 0 | 0 | 0 | 0 | 0 | 0 | 0 | 0 | 0 | 0 | 0 | 0 | 0 | 0 | 0 |
| hl_a0210_accept | 0 | 0 | 0 | 0 | 0 | 0 | 0 | 0 | 0 | 0 | 0 | 0 | 0 | 0 | 0 | 0 | 0 | 0 | 0 | 0 |
| hl_a0210_timeout | 0 | 0 | 0 | 0 | 0 | 0 | 0 | 0 | 0 | 0 | 0 | 0 | 0 | 0 | 0 | 0 | 0 | 0 | 0 | 0 |
| hl_a0210_reject | 0 | 0 | 0 | 0 | 0 | 0 | 0 | 0 | 0 | 0 | 0 | 0 | 0 | 0 | 0 | 0 | 0 | 0 | 0 | 0 |
| hl_m0100_present | 1 | 0 | 1 | 0 | 1 | 1 | 1 | 1 | 0 | 1 | 1 | 0 | 1 | 1 | 1 | 1 | 1 | 1 | 1 | 0 |
| hl_m0100_accept | 1 | 0 | 1 | 0 | 1 | 1 | 1 | 1 | 0 | 1 | 1 | 0 | 1 | 1 | 1 | 1 | 1 | 1 | 1 | 0 |
| hl_m0100_timeout | 0 | 0 | 0 | 0 | 0 | 0 | 0 | 0 | 0 | 0 | 0 | 0 | 0 | 0 | 0 | 0 | 0 | 0 | 0 | 0 |
| hl_m0100_reject | 0 | 0 | 0 | 0 | 0 | 0 | 0 | 0 | 0 | 0 | 0 | 0 | 0 | 0 | 0 | 0 | 0 | 0 | 0 | 0 |
| hl_m0113_present | 0 | 0 | 0 | 0 | 0 | 1 | 1 | 1 | 0 | 1 | 1 | 0 | 0 | 0 | 0 | 0 | 0 | 0 | 0 | 0 |
| hl_m0113_accept | 0 | 0 | 0 | 0 | 0 | 1 | 1 | 1 | 0 | 0 | 0 | 0 | 0 | 0 | 1 | 0 | 0 | 0 | 0 | 0 |
| hl_m0113_timeout | 0 | 0 | 0 | 0 | 0 | 0 | 0 | 0 | 0 | 1 | 1 | 0 | 1 | 1 | 0 | 1 | 1 | 1 | 1 | 1 |
| hl_m0113_reject | 0 | 0 | 0 | 1 | 1 | 0 | 1 | 1 | 1 | 1 | 1 | 1 | 1 | 0 | 0 | 1 | 1 | 1 | 1 | 0 |
| hl_m0420_present | 0 | 1 | 0 | 1 | 1 | 0 | 1 | 1 | 1 | 1 | 1 | 1 | 1 | 0 | 0 | 0 | 0 | 0 | 0 | 0 |
| hl_m0420_accept | 0 | 1 | 0 | 0 | 0 | 0 | 0 | 0 | 1 | 1 | 1 | 1 | 1 | 0 | 0 | 0 | 0 | 0 | 0 | 0 |
| hl_m0420_timeout | 0 | 0 | 0 | 0 | 2 | 0 | 0 | 0 | 0 | 2 | 0 | 0 | 0 | 0 | 0 | 0 | 0 | 0 | 0 | 1 |
| hl_m0420_reject | 0 | 0 | 0 | 0 | 0 | 0 | 0 | 0 | 0 | 0 | 0 | 0 | 0 | 0 | 0 | 0 | 0 | 0 | 0 | 0 |
| hl_y0150_present | 0 | 0 | 0 | 0 | 0 | 0 | 0 | 0 | 0 | 0 | 0 | 0 | 0 | 0 | 0 | 0 | 0 | 0 | 0 | 0 |
| hl_y0150_accept | 0 | 0 | 0 | 0 | 0 | 0 | 0 | 0 | 0 | 0 | 0 | 0 | 0 | 0 | 0 | 0 | 0 | 0 | 0 | 0 |
| hl_y0150_timeout | 0 | 0 | 0 | 0 | 0 | 0 | 0 | 0 | 0 | 0 | 0 | 0 | 0 | 0 | 0 | 0 | 0 | 0 | 0 | 0 |
| hl_y0150_reject | 0 | 0 | 0 | 0 | 0 | 0 | 0 | 0 | 0 | 0 | 0 | 0 | 0 | 0 | 0 | 0 | 0 | 0 | 0 | 0 |
| cust. sat. score | 100 | 100 | 42 | 100 | 100 | 17 | 83 | 92 | 0 | 92 | 67 | 83 | 0 | 100 | 0 | 92 | 100 | 100 | 33 | 0 |

910

Legend: #Samples/Customer Satisfaction Score

| CSAT | #Surveys | Node Traffic(%) | Rules |
|---|---|---|---|
| 7 | 5 | 3.8 | [hl_a0210_reject>1] |
| 8 | 5 | 1 | [hl_m0100_timeout>0] [hl_a0210_timeout>0] |
| 10 | 5 | 1.8 | [hl_m0113_timeout>0] |
| 13 | 5 | 2.7 | [hl_a0210_reject>0] [hl_m0100_reject>1] |
| 18 | 6 | 1.5 | [hl_m0113_present>0] [hl_m0100_timeout>0] |
| 20 | 7 | 3.8 | [hl_m0113_reject>0] |
| 21 | 8 | 4.5 | [hl_a0210_reject>0] [hl_m0113_present>0] |
| 22 | 9 | 2.1 | [hl_a0210_timeout>0] |
| 23 | 10 | 2.7 | [hl_m0100_timeout>0] |
| 24 | 6 | 3.7 | [hl_m0100_reject>0] [hl_a0210_reject>0] |
| 26 | 13 | 6.8 | [hl_m0113_present>0] [hl_a0210_present>0] |
| 26 | 7 | 5 | [hl_m0100_reject>1] |
| 27 | 13 | 5.2 | [hl_m0113_present>0] [hl_m0420_timeout>0] |
| 29 | 12 | 3.8 | [hl_a0210_present<=0] [hl_m0420_timeout>0] |
| 29 | 10 | 4.9 | [hl_m0113_present>0] [hl_m0100_reject>0] |
| 34 | 15 | 9.3 | [hl_a0210_reject>0] |
| 37 | 20 | 11.9 | [hl_m0100_reject>0] |
| 37 | 5 | 0.3 | [hl_y0150_present<=0] [hl_y0200_reject>0] |
| 40 | 29 | 12 | [hl_m0420_timeout>0] |
| 40 | 19 | 5.6 | [hl_y0150_present<=0] [hl_m0420_timeout>0] |
| 41 | 30 | 7.8 | [hl_a0210_present<=0] [hl_y0400_present>0] |
| 41 | 11 | 4.1 | [hl_y0150_timeout>0] |
| 42 | 32 | 8.9 | [hl_y0400_present>0] |
| 47 | 72 | 29 | [hl_m0113_present>0] |
| 47 | 14 | 10.8 | [hl_m0420_reject>0] |
| 50 | 75 | 24.2 | [hl_y0150_present<=0] |
| 53 | 63 | 26.6 | [hl_a0210_present<=0] |
| 68 | 22 | 13.3 | [hl_a0210_present<=0] [hl_y0150_present>0] |
| 74 | 14 | 3.2 | [hl_y0250_timeout>1] |

SYSTEM AND METHOD FOR IMPROVING TUNING USING USER PROVIDED SATISFACTION SCORES

PRIORITY CLAIM

This U.S. nonprovisional patent application claims priority from, and is a continuation of, U.S. patent application Ser. No. 13/352,499, filed on Jan. 18, 2012 with the same title and inventors as the present application, and which itself claimed priority from. That application was itself claims priority from, and was a continuation of, U.S. patent application Ser. No. 12/338,064, filed on Dec. 18, 2008, and entitled System and Method for Improving Tuning Using Caller Provided Satisfaction Scores. That application in turn claimed priority to U.S. Provisional Patent Application Ser. No. 61/014,771, filed Dec. 19, 2007, entitled System and Method for Automatic Identification of Tuning Opportunities Using Caller Provided Satisfaction Scores. The disclosures of each of those applications are hereby incorporated by reference in their entirety.

TECHNICAL FIELD

The technical field of this application includes computerized interactive voice response (IVR) systems.

BACKGROUND

IVR systems are a communications technology that allow a computer to detect voice and touch tones during a normal phone call. An IVR system can respond with pre-recorded or dynamically generated audio to further direct callers on how to proceed with a customer service request. IVR systems can be used to control almost any function where the interface can be divided into a series of menu choices. IVR systems are typically used to service high call volumes, reduce cost and improve the customer experience. Examples of typical IVR applications include telephone banking and credit card transactions.

IVR systems may be monitored and updated for any of several reasons. For example, an IVR system may be updated to keep pace with changing business needs and changing customer service requests. Similarly, IVR systems may be updated in terms of improving an IVR system's performance. IVR system performance may be defined in any of several ways. For example, IVR system performance may relate to delivering better customer service by increasing customer satisfaction metrics. Similarly, IVR system performance may relate to improving customer containment within the IVR, thereby reducing the number of callers transferred to a live customer service representative (CSR). Regardless of the motivating factor, updating an IVR system to improve its performance may be referred to as tuning the IVR system.

Because IVR systems are computerized systems that address large call volumes and generate numerous data records, monitoring and analyzing such IVR systems may pose a challenge in terms of information management. Various analysis packages have been developed that allow an IVR system analyst to review data recorded from the IVR system and make decisions regarding where best to tune the IVR system. Some such analysis packages segment calls from an IVR system by category so that companies can see the most common types of calls and where they may need to correct or improve a current business practice. Other types of analysis packages may record audio files from caller interactions with the IVR for future playback by an IVR system analyst. Still other analysis packages may map calls to graphically show their sequence and where callers may be experiencing difficulty with an IVR system.

While several analysis packages do exist to help IVR system analysts review the performance of an IVR system, these analysis packages are limited because they perform analysis from the IVR system's or IVR system analyst's point of view. These approaches do not explicitly include the caller's experience with the IVR, which may indicate the caller's state of mind, his environment, and the caller's hidden requirements that are not explicitly stated in the IVR. Hence, from the IVR system's or IVR system analyst's point of view, a call may be perfect with no errors, but the caller may still be unsatisfied. Hence, the outputs of the prior art analysis packages do not always address the callers' needs. Certain embodiments described further herein are designed to provide a solution to one or more of the weaknesses in IVR tuning technology set forth above.

SUMMARY

Embodiments disclosed herein relate to a system and method for improving customer satisfaction with an IVR system. In some embodiments, this is accomplished by using customer satisfaction scores to identify opportunities to tune an IVR, and then tune the IVR to improve customer satisfaction.

It will be appreciated by those skilled in the art that the teachings disclosed herein may be used to improve an IVR system's effectiveness in terms of containment and other measures. Also, the teaching disclosed herein may be adapted to web based customer service applications. More specifically, the navigational patterns of the website may be linked with a user provided survey to identify deficiencies in the web application and enhance web content to better meet the user's needs.

Systems and methods of various embodiments described herein may be implemented in a computer environment using computer readable mediums, computer executable instructions, and other suitable hardware. It should further be understood that the system and method disclosed herein may be associated with an automated feedback loop. An example of such a feedback loop can be seen in U.S. Ser. No. 11/276,497, entitled SYSTEM AND METHOD FOR CLOSED LOOP DECISION MAKING IN AN AUTOMATED CARE SYSTEM, filed Mar. 2, 2006, the disclosure of which is incorporated herein by reference. Associating the systems and methods disclosed herein with an automated feedback loop may provide advantages in terms of data collection, data processing, and/or data analysis.

All terms defined herein shall be read to include, but not be limited to, all meaning ordinarily ascribed to that term by those of ordinary skill in the art, and any additional meaning described. Before providing further description of exemplary embodiments, it will be instructive to provide some term definitions.

The term "tuning," shall be read to include, but not be limited to, any adjustment of a system or process to improve performance.

The term "containment," shall be read to include, but not be limited to, the duration a caller remains in an IVR system.

The term "event log," shall be read to include, but not be limited to, any log that captures computer data. By way of example, and not limitation, an event log for an IVR application may capture all information associated with a call. For instance, an event log may show each dialog module visited, the result from each dialog module visited, calling frequency, results from previous calls, day and time of calls, call duration, number of failures in each dialog module, the speech recognition result from each dialog module, etc. Additionally, an event log may capture data in a variety of formats. For example, an event log may record audio data, text data, or text data derived from a computer conversion of audio data to text data.

The term "survey log" shall be read to include, but not be limited to, any log that captures survey data. By way of example, and not limitation, a survey log for an IVR application may capture a caller's responses to survey questions asked by the IVR application.

The term "unique call identifier," shall be read to include, but not be limited to, any manner of grouping calls from an IVR application so that each portion of an event log is easily associated with the call from that portion of the event log. Those of ordinary skill in the art will appreciate that event logs do not typically record call information from an IVR application in sequenced order by call. Therefore, assigning a unique call identifier is a way to group the event log records in sequenced order by call.

The term "simplified call flow log," shall be read to include, but not be limited to, a record of calls in an IVR system organized by call and displaying the calls according to their sequence of events in the IVR application.

The term "simplified compiled log," shall be read to include, but not be limited to, a record of calls in an IVR system organized by call and matched to the corresponding customer satisfaction score for the given call.

The term "correlation," shall be read to include, but not be limited to, the degree to which two or more attributes or measurements show a tendency to vary together. The variation of correlated attributes or measurements may be positive or negative. When a positive correlation exists, as one attribute or measurement increases, the other attribute or measurement increases. Alternatively, when one attribute or measurement decreases, the other attribute or measurement decreases. When a negative correlation exists, as one attribute or measurement increases, the other attribute or measurement decreases. Alternatively, when one attribute or measurement decreases, the other attribute or measurement increases.

The term "computer readable medium," shall be read to include, but not be limited to, any device or medium, or combination of devices and media, which is capable of storing computer readable and/or executable instructions and/or data.

The term "computer executable instructions," shall be read to include, but not be limited to, any combination of one or more computer instructions regardless of how organized, whether into one or more modules, one or more programs, a distributed system or any other organization.

The term "node traffic," shall be read to include, but not be limited to, the number of occurrences observed for a given prompt.

In considering the systems and methods described herein, it should be understood that the systems and method may include, but are not limited to, any of the following versions.

In one version, a computer readable medium has computer executable instructions to perform a method for improving customer satisfaction with an IVR. In this version, the IVR has a customer satisfaction survey. One step of the method is processing an event log from the IVR. The processed event log includes call information, such as, prompt type, prompt response, and prompt result. The act of processing the event log results in organizing the call information by unique call. Another step includes integrating a survey log with the processed event log. The survey log includes a customer satisfaction score related to the customer's satisfaction with the IVR. The customer satisfaction score is provided by the customer in response to the customer satisfaction survey. A next step is identifying a portion of the call information and measuring the occurrences for the portion of the call information. This portion of the call information is then analyzed using the occurrences and customer satisfaction score to determine whether the portion of the call information is associated with a low customer satisfaction score.

In another version, the method also includes creating a report. The report may include a table having a list of portions of call information associated with low customer satisfaction scores. This list may further be prioritized by the customer satisfaction score. Alternatively, or in addition, the report may include a graph that includes a series of leaf nodes, where each leaf node represents an area of the IVR associated with the customer satisfaction score. Furthermore, the customer satisfaction score of the graph is based on an average of survey responses from a plurality of customers.

In another version, the act of analyzing the portions of the call information further comprise creating a correlation comparing a first state where the portion of the call information was present in the event log to a second state where the portion of the call information was not present in the event log. Furthermore, the result of the correlation may be weighted using the occurrences of the portion of the call information.

In another version, the portion of the call information may include any of the following pieces of call information, singularly or in combination: prompt type, prompt result, prompt response, and dialog module result. Still in other versions, the portion of the call information may include a call path.

In some versions, where the portion of the call information includes a prompt response, the prompt response comprises a timeout. In some versions, where the portion of the call information includes a prompt result, the prompt result comprises a reject value, which indicates that the prompt response was not recognized by the IVR—also known as a "no match" scenario.

In another version, the act of processing the event log comprises: (a) identifying call timestamp information; (b) identifying an automatic number identification (ANI); (c) identifying an IVR application name; (d) creating a unique call identifier for each call based on the timestamp information and the ANI; (e) assigning the unique call identifier to each call; and (f) grouping the call information from the event log by the unique call identifier.

In another version, the act of integrating the survey log with the processed event log comprises: (a) creating a common unique call identifier for the survey log and the processed event log; and (b) matching the data from the survey log to the data from the processed event log using the common unique call identifier.

In another version, a computer readable medium includes computer executable instructions to perform a method for improving customer satisfaction with an IVR having a customer satisfaction survey, the method comprising: (a) accessing call events, and responses from a customer to the customer satisfaction survey, in one or more logs; (b) selecting one or more prompts of the IVR and the associated information for analysis; and (c) correlating the selected one or more prompts and the associated information with the matching responses to the customer satisfaction survey.

In another version, the method further comprises weighting the responses from the customer satisfaction survey. Such weighting may be done according to a customer's value. In some versions, the act of weighting comprises: (a) measuring occurrences of the one or more prompts and the associated information selected for analysis; and (b) artificially increasing the observed occurrences by a factor commensurate with the customer's value prior to the act of correlating the one or more prompts and the associated information to the responses from the customer satisfaction survey.

In another version, a system exists for improving customer satisfaction with an IVR, the system comprises: (a) a processor; (b) a user interface; (c) a computer readable medium associated with the processor; and (d) a set of computer executable instructions, wherein the set of computer executable instructions are encoded on the computer readable medium, and the set of computer executable instructions when executed: (i) process a computerized event log, wherein the event log includes call information from the IVR; (ii) integrate a computerized survey log with the event log, wherein the survey log includes a customer satisfaction score associated with the IVR; and (iii) identify call paths from the IVR associated with low customer satisfaction scores, wherein the call paths are comprised of a plurality of prompts from the IVR.

BRIEF DESCRIPTION OF THE DRAWINGS

Further description of the embodiments is provided in the accompanying detailed description, which may be best understood in conjunction with the accompanying diagrams, where like parts in each of the several diagrams are labeled with like numbers, and where:

FIG. 6 depicts an exemplary redacted processed event log of FIG. 1.

FIG. 7 depicts an exemplary survey log of FIG. 1.

FIG. 8 depicts an exemplary simplified compiled log of FIG. 1.

FIG. 9 depicts an exemplary data table derived from a simplified compiled log.

FIG. 11 depicts an exemplary tuning opportunity report in table form.

DETAILED DESCRIPTION

Reference should now turn to the figures, which depict a system and method for improving customer satisfaction with an IVR system. Improvements are achieved by identifying tuning opportunities in an IVR system using a customer satisfaction score, and tuning the IVR accordingly. In the figures, like parts are designated with like numerals throughout.

Figure 1:
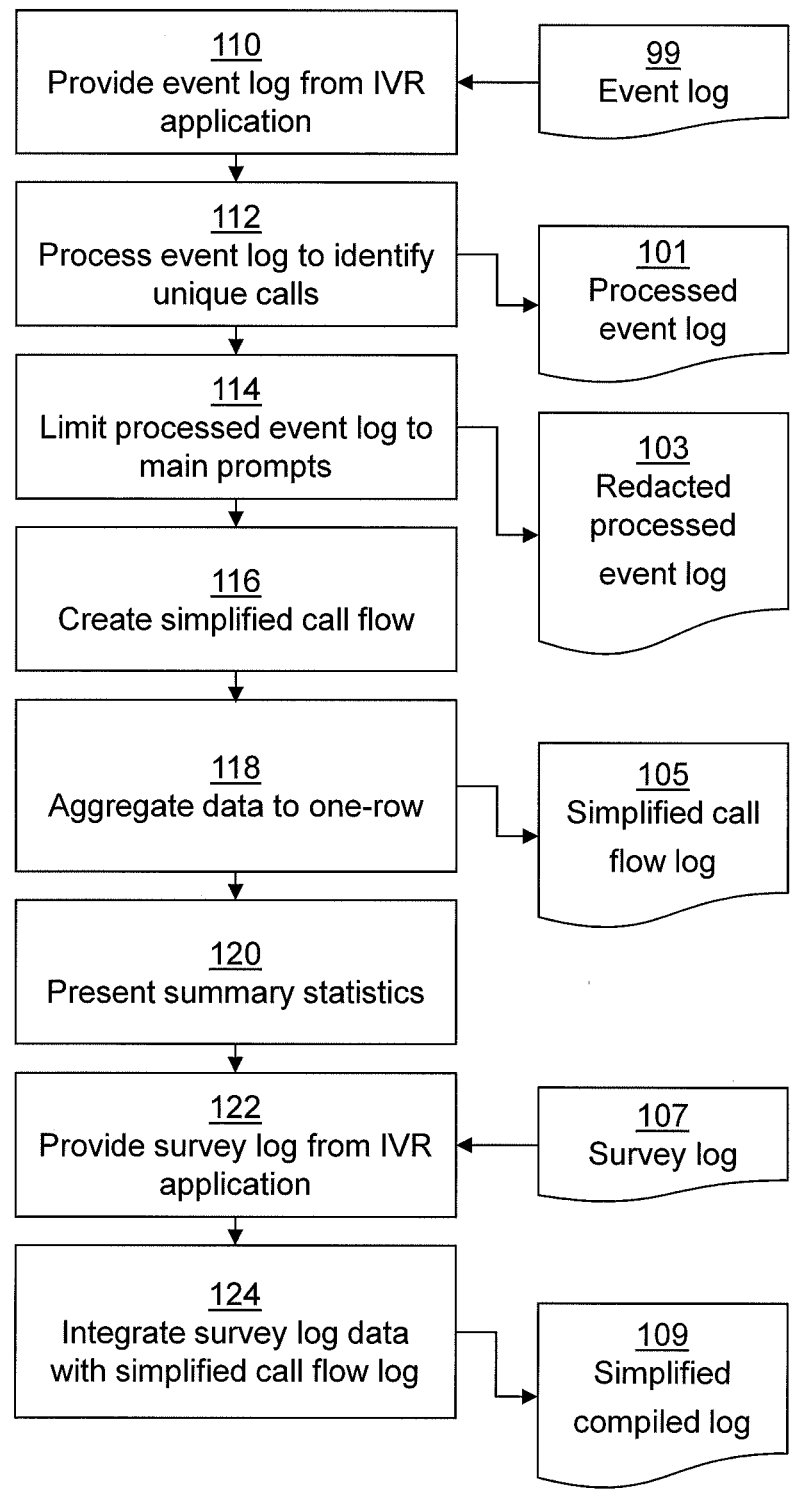
FIG. 1 depicts a high-level flow diagram of a process for improving performance of an interactive voice response application.

Referring to FIG. 1, a method is shown for improving customer satisfaction with an IVR application. Block 110 depicts the step of providing an event log 99 from an IVR application. In some versions, the event log 99 may be provided to an IVR system administrator. The event log 99 may be provided as a data record on any suitable storage means, but preferably any suitable computer readable medium. Furthermore the event log 99 may be provided locally or over a network connection. In other versions, providing the event log 99 may encompass transmitting the event log 99 from one system or data location to another system or data location.

In considering the step of block 110, it should be appreciated that an IVR system may be comprised of one or more IVR applications, and an event log 99 may be organized in a variety of ways. For example, an event log 99 may be specific to a particular IVR application within an IVR system. Alternatively an event log 99 may capture information from multiple IVR applications within an IVR system. By way of example, an IVR system may contain two IVR applications: a change of address application and a store locator application. An event log 99 may exist for each application separately, or a single event log 99 may exist for both applications. Those of ordinary skill in the art will appreciate that the important aspect in this regard is to capture the event information from the calls in any suitable organization of an event log 99.

Additionally, it will be appreciated that event log 99 may be represented by a variety of other names known in the art. For example, in some versions, an event log 99 may be the same as, or similar to, a tuning log. Those of ordinary skill in the art will appreciate that the important aspect is not the nomenclature used to describe the log, but the data captured in the log itself, as discussed below.

In block 112, the data from the event log 99 is processed to identify unique calls and their process flows. It will be appreciated that the event log 99 is a collection of call events recorded as the events occur within the IVR. For example, the event log 99 is not organized by caller, but rather events are recorded as they occur within the IVR. So, events from separate calls may appear next to each other in the event log 99. Thus the data from the event log 99 must be further processed to organize the data by unique call.

Figure 2:
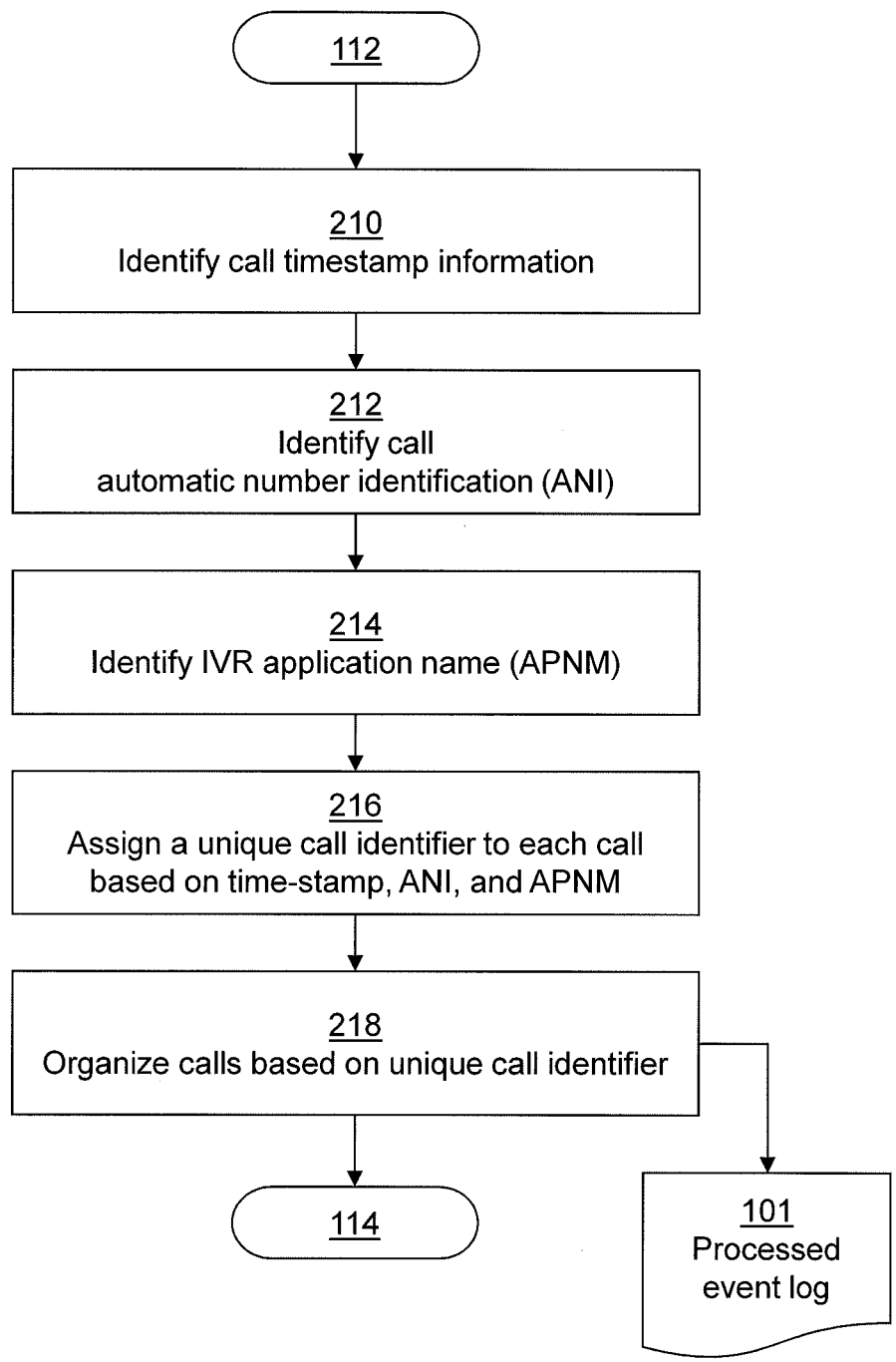
FIG. 2 depicts a flow diagram for processing the event log of FIG. 1.

Referring to FIG. 2, the steps involved in processing the data from the event log 99 are shown. In block 210, call timestamp information is identified. Next, block 212 depicts a process for further call identification using the call automatic number identification (ANI). Furthermore, block 214 depicts a process for identifying the IVR application name (APNM). Block 216 depicts associating a unique call identifier to each call based on the timestamp, ANI, and APNM. Block 218 depicts the step of organizing the calls in the event log 99 based on the unique call identifier to produce a processed event log 101. Those of ordinary skill in the art will appreciate that the above description provides only one exemplary way to process the data of the event log 99 to identify unique calls. Other approaches may be suitable as well, and the exact method used should not be limited to only those approaches described herein. Any approach that produces a process event log 101 that can be subsequently analyzed by unique call would be suitable. It should further be appreciated that, after an initial programming, this step of processing the event log 99 may be automated when practicing the method for subsequent event logs containing the same or similar data types and organizations.

Referring again to FIG. 1, in block 114, the data captured in the processed event log 101 may be limited to focus on main prompts of the IVR, thereby producing a redacted processed event log 103. In particular, the data may be limited to focus on those areas of the IVR relevant to analyzing the impact on customer satisfaction. By way of example only, data fields that may be excluded may include processing time descriptors. The reasoning here may be that processing time descriptors have a low chance of truly impacting customer satisfaction so they can be ignored and excluded from the data set. It should be appreciated that the step in block 114 may be optional in some versions. Where the limiting step is used, however, the decision regarding what data fields to include may be made by an IVR system administrator or other individual designing the systems and methods disclosed herein. It should further be appreciated that, after an initial programming, this process of limiting may be automated when practicing the method for subsequent event logs containing the same or similar data types and organizations.

In block 116, a simplified call flow is created by further processing of the redacted processed event log 103. To understand how this simplified call flow is created, reference to an exemplary high-level IVR application exchange and configuration is helpful.

In the exemplary IVR high-level exchange, there is a prompt, response, and result. The prompt is provided to a caller by the IVR. The prompt may take a variety of forms. By way of example only, a prompt may ask the caller to input the reason for their call. In doing so, the IVR may or may not provide a list of selections to choose from when responding to the prompt. After the prompt is delivered to the caller, the caller provides a response to the IVR. In some IVRs the caller's response may be made by pressing the keypad on the telephone or by spoken word(s). After receiving the response from the caller, the IVR must interpret the response to produce a result. The result may frequently include identifying a subsequent prompt to provide to the caller, at which point this exchange process repeats.

In the exemplary IVR configuration, the IVR application is organized into one or more dialog modules. The one or more dialog modules may contain one or more prompts. Each attempt in providing a unique prompt to a caller and acquiring a response may be represented as a state. By way of example only, an IVR application may be structured to permit attempting the same prompt twice before transferring the caller to a live agent. In such a case, the first presentation of the prompt may be said to occur in state 1, while the second presentation of the prompt may be said to occur in state 2. Assuming, in this example, that the prompt and response exchange was unsuccessful in both attempts, the results at state 1 and state 2 would be unsuccessful; also, the result of the dialog module as a whole would be unsuccessful. It should be noted here that there may have been a sequence of successful prompts occurring in the dialog module before the unsuccessful prompt was encountered. Although there were some successful prompts in the dialog module, the result of the dialog module is nonetheless considered unsuccessful due to the two failed attempts at the unsuccessful prompt. An exemplary structure similar to this example will be discussed later with respect to FIGS. 6-8.

Having provided an exemplary IVR application exchange and configuration above, it should be understood that several approaches for configuring an IVR application may be suitable. Furthermore, the disclosure of the exchange and configuration above is exemplary only and should not be considered limiting.

Returning now to the simplified call flow creation of block 116, a simplified call flow may be created by capturing certain information associated with the dialog modules and prompts appearing in the calls of the redacted processed event log 103. For example, the information to capture may include, among others: (1) the prompt name (PRNM), (2) the prompt type (PRTX), (3) whether the prompt was interrupted by the caller—i.e., did the caller barge in (BRGN), (4) the time of any barge in (BTIM), (5) the mode of prompt response (MODE), (6) the prompt response (TRTT), (7) the prompt result for a given state (RDEC), (8) the dialog module name (DMNM), and (9) the dialog module result (TSTT).

By way of example only, in an IVR application for a store locator, the application may include an alpha-numeric dialog module name (DMNM) of M0500. The M0500 dialog module may include a "get zip code" prompt in the IVR that states "please say or enter your five digit zip code." The caller may respond by speaking "45202." The IVR may accept this response and move to a subsequent prompt. The prompt type (PRTX) in this example may be considered "get zip code." The prompt name (PRNM) may be considered "initial," possibly indicating this was the first prompt in this dialog module. The prompt response (TRTT) may be considered "45202." The prompt result (RDEC) may be considered "accept." The mode of response (MODE) may be considered "SPCH," indicating the response was spoken. Assuming that no prompts in the dialog module were unsuccessful, the dialog module result (TSTT) may be considered "success." Thus this exchange could be represented by the following expression:

DMNM=M0500
PRNM=initial
PRTX=get zip code
MODE=SPCH
TSTT=45202
RDEC=accept
TRTT=success.

It should be understood that the above simplified call flow is merely exemplary. Other prompts and the information associated with the prompts may be included in addition, or in the alternative, to that described in the above example. For instance, other prompt response modes (MODE) may include designations of "tone" or "timeout." Such a designation may occur where the caller either entered a response using the telephone keypad or the caller did not provide a response to the prompt whatsoever. Other prompt results (RDEC) may include "reject," "failure," or "confirm." A "reject" may occur where the IVR did not receive a response from a caller or the IVR received a response that was unrecognized. A "failure" may occur after a prompt has been unsuccessful for a predetermined number of attempts. A "confirm" may occur when a response was received, but the confidence in the response was below a predetermined value (possibly from a lower than desired confidence measure of a speech recognition program).

It should be appreciated that these above exemplary combinations of prompt response modes (MODE) and prompt results (RDEC) are not intended to be exhaustive or limiting. For instance, a "timeout" prompt response mode (MODE) may lead to a "confirm" prompt result (RDEC) where the prompt is repeated to the caller instead of a "reject" prompt result where possibly an alternate prompt is provided to the caller. It will also be appreciated from the above examples, that the information associated with the prompt response mode (MODE), prompt result (RDEC), etc. are not fixed. For instance, in one version the system administrator may configure a "timeout" to be reflected as an output of the prompt response mode (MODE). However, in another version the system administrator may configure a "timeout" to be reflected as an output to the prompt result (RDEC). Those of ordinary skill in the art will appreciate the many options available with respect to prompts and the information associated with the prompts.

In some other versions, the information associated with the dialog modules and prompts discussed above may be presented and understood as phrases. In such versions a phrase may represent all or a portion of the prompt and response exchange. For example, a phrase may represent the prompt type (PRTX) in combination with the prompt response mode (MODE) and prompt result at a given state (RDEC). As an example only, a phrase could represent a prompt asking for a zip code along with the caller's lack of response within a prescribed time. In this example, the phrase may be represented by the simplified expression: "get zip code—timeout—failure." Still in other versions some of ordinary skill in the art will refer to portions of the prompt and response exchange as features. Those of ordinary skill in the art will appreciate that the nomenclature used to describe the exchange in the simplified call flow is not essential. Instead, the nomenclature may be adapted to suit the system administrator's preferences when designing the simplified call flow. The important feature here is that the exchange between the IVR and caller is captured in a way where the data can be used for later analysis as discussed further below.

Another point in considering block 116 and creating the simplified call flow is that various techniques may be used to accomplish this step. In one exemplary version, event log 99 may already capture the desired data in a usefully labeled form, and such event logs 99 may require very little additional processing after steps 112 and 114, if any, to arrive at a simplified call flow. For instance creating the simplified call flow may be a matter of further excluding irrelevant portions of the redacted processed event log 103. Still in another exemplary version, the captured data in the event log 99 may require more substantial processing steps to arrive at a simplified call flow after completing steps 112 and 114. For instance, where an event log 99 does not capture the data in a usefully labeled form, the data of the redacted processed event log 103 may require re-coding. Such re-coding may involve applying abbreviated designations to relevant portions of the IVR for later analysis. For example, where a prompt response mode (MODE) shows a timeout, this may be re-coded as a "no input." Furthermore, where a response was received at the prompt response (TSTT) field, yet a "reject" prompt result (RDEC) was recorded, this may be re-coded as a "no match." It should further be appreciated that, after an initial programming, this process of further processing to arrive at a simplified call flow may be automated when practicing the method for subsequent event logs containing the same or similar data types and organizations.

In block 118, the data from the simplified call flow is aggregated into a one row format where each row represents the complete course of a unique call. This representation may be known as the simplified call flow log 105.

In block 120, summary statistics may be presented for each unique call. Summary statistics may include metrics such as the total number of prompts, the number of accepted responses, the number of failed responses, the number of rejected responses, the number of confirmed responses, and the ratio of successful responses to total prompts. Those of ordinary skill in the art will further appreciate that this list of summary statistics is not exhaustive and other summary statistics may be presented as well. Furthermore summary statistics may be presented for a grouping of calls in addition to, or in the alternative to, the summary statistics presented for each unique call. At a macro level, the summary statistics may provide insight as to overall IVR application performance.

Block 122 depicts the step of providing a survey log 107 from a customer satisfaction survey related to the IVR application. The survey log 107 is a collection of all call survey prompts and responses recorded as the surveys are conducted. In some embodiments, the customer satisfaction survey will include a customer satisfaction score. The customer satisfaction score may be directly or indirectly related to the performance of the IVR application.

One of ordinary skill in the art will appreciate that a customer satisfaction survey, incorporated into an IVR application, may be designed in any number of ways. For instance, the customer satisfaction score may be based on the response to a single question or it may be a calculated score from a multitude of responses. By way of example, and not limitation, an IVR application may play a prompt asking a customer to score his overall satisfaction with the IVR application. Such a survey may ask the one or more survey questions at any area within the IVR application. For instance, a survey may be requested by the IVR after the caller has completed the IVR application. In another example, the IVR application may prompt the caller to answer a survey before transferring the caller to a live agent/customer service representative (CSR). Customer satisfaction surveys may be structured to gather responses on any variety of scales that will be appreciated by those of ordinary skill in the art. By way of example only, the scale used may be a numeric scale such as 1 to 10, or 1 to 100. Alternatively the scale used may be a letter scale such as "A," "B," "C" and so forth. Also, such surveys may acquire responses in numeric form, recorded audio form, or textual form. Those of ordinary skill in the art will appreciate the myriad of ways to structure customer satisfaction surveys.

In block 124, the data from the survey log 107 is integrated with the simplified call flow log 105. To accurately integrate the data from the survey log 107, the data must be identifiable as from a unique call that is listed in the simplified call flow log 105. In one example, the data from the survey log 107 may use the same timestamp, ANI, and IVR application name data fields to identify the call that the survey is associated with. Thus, using the timestamp, ANI, and IVR application name, each unique survey from the survey log 107 may be matched with the corresponding unique call from the simplified call flow log 105 to produce a simplified compiled log 109.

Figure 3:
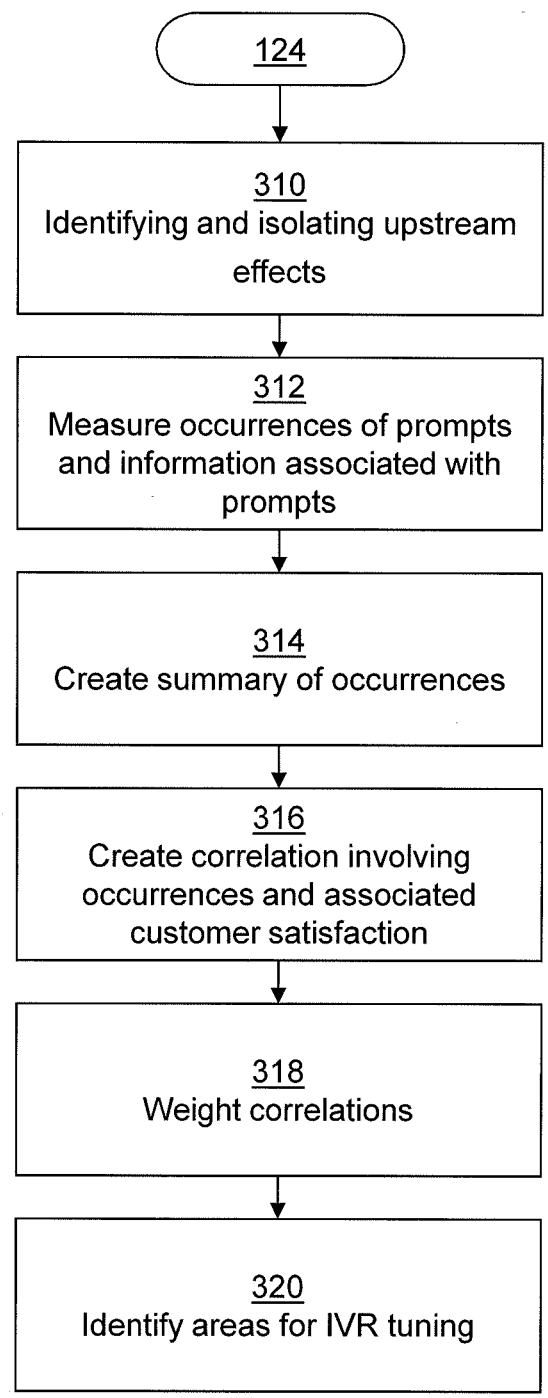
FIG. 3 depicts a flow diagram of a process for analyzing the simplified compiled log of FIG. 1 in a prompt level analysis.
Figure 4:
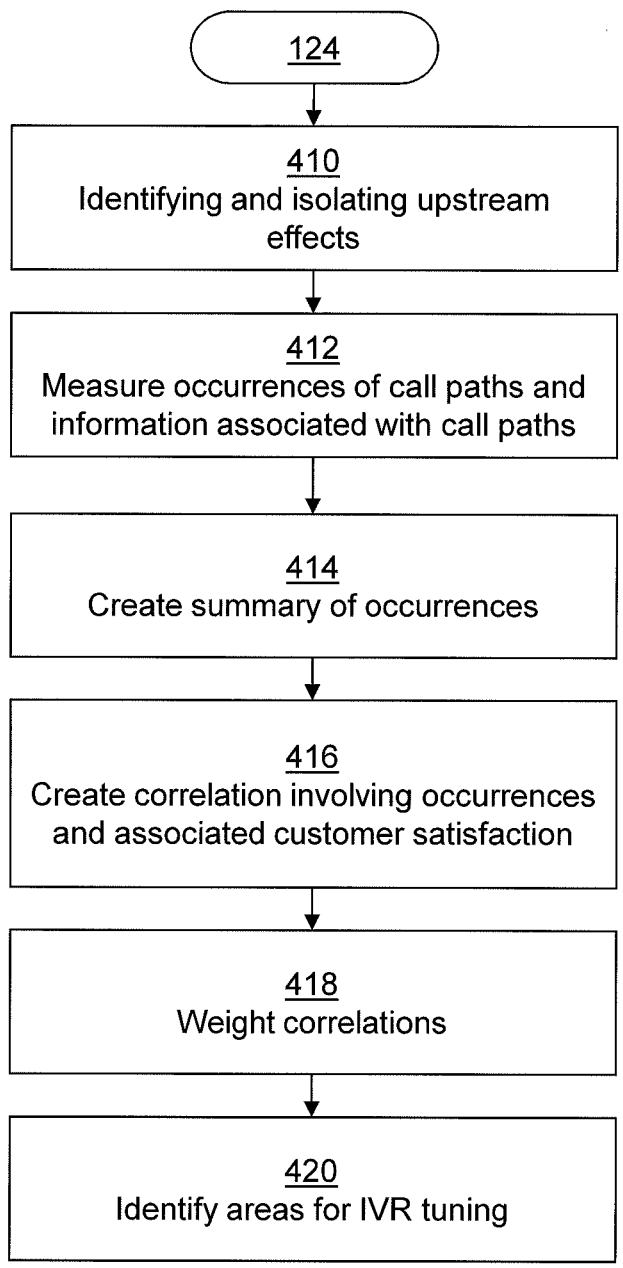
FIG. 4 depicts a flow diagram of a process for analyzing the simplified compiled log of FIG. 1 in a call path level analysis.

Referring now to FIGS. 3 and 4, exemplary methods of analyzing the simplified compiled log 109 are shown. These analyses may take various approaches and should not be limited to only the approaches discussed with respect to FIGS. 3 and 4.

FIG. 3 shows an exemplary method for analyzing the simplified compiled log 109 at the prompt level. The objective with this analysis is to determine the impact of an exchange where the exchange is limited to a given prompt, response, and result.

FIG. 4 shows an exemplary method for analyzing the simplified compiled log 109 at the call path level. The call path level is where the exchanges from more than one prompt are combined, and the combination is analyzed. The objective with this analysis is to determine the impact of an exchange where the exchange extends to a combination of prompts, responses, and results. It should be appreciated that the prompts, responses, and results that make up a call path may be, but are not required to be, sequential prompts, responses, and results occurring within the calls.

As a first step in either the prompt level or call path level analysis, blocks 310 and 410 show the step of identifying and isolating upstream effects that may skew the analysis for a known reason. An example of an upstream effect may relate to separating certain call types where a caller may be predisposed to give a low customer satisfaction score. By way of example only, a caller may have been receiving numerous telephone solicitations from his bank to sign-up for the bank's latest credit card offering. The caller may be frustrated with these numerous calls and decide to call his bank to request placement on a "do not call list." Upon calling his bank, the caller may be routed to an IVR. Although the IVR may be equipped to handle the caller's request, the caller may still provide low satisfaction responses to the survey based on his frustration experienced outside the IVR. In another example of an upstream effect, a small business owner may be frustrated by receiving his telephone bill for his business at his home address instead of his business address. The caller may decide to call the telephone company to request a change of address on file for his business. The caller may be routed to an IVR to handle his request. Although the IVR may be equipped to handle the caller's request, the caller may still provide low satisfaction responses to the survey based on his frustration experienced outside the IVR. Thus in the analysis, it may be appropriate to isolate these types of calls to gain a more accurate assessment of caller satisfaction with the IVR itself rather than having the caller's experience outside the IVR inaccurately influence their satisfaction score for their experiences inside the IVR. The upstream effects described here are not exhaustive and those of ordinary skill in the art will appreciate the myriad of upstream effects that may exist and be properly identified and isolated when doing the analysis.

Now referring to FIG. 3, in block 312, the simplified compiled log 109 is analyzed to measure the occurrences, within each call, of the prompts and information associated with the prompts. This step may focus on collecting the occurrences for the prompts alone, regardless of the information associated with the prompts, e.g. prompt response or prompt result. For instance, the occurrences of just the "get zip code" prompt may be measured. In other embodiments this step may focus on collecting the occurrences for the prompt plus specific associated information. For instance, the occurrences of the "get zip code" prompt with a "no input" response may be measured. In another example, the occurrences of the "get zip code" prompt with a "failure" result may be measured. Still in other embodiments, this step may focus on collecting the occurrences for only the information associated with the prompts, and not the prompts themselves. For instance, the occurrences of all "no input" responses may be measured, regardless of the prompt they are associated with. In another example, the occurrences of "failure" results may be measured. Those of ordinary skill in the art will appreciate that the measurement of occurrences may be structured to take any of a variety of forms as the above examples show.

FIG. 3 further includes a summary creation step as shown in block 314. The summary created in block 314 may include a breakdown of the occurrences measured for the prompts and information associated with the prompts. As will be discussed in further detail later, these summary statistics may be useful in certain aspects of the analysis, e.g. prioritizing the analysis results by weighting the analysis by frequency of the occurrence of a specific prompt, etc.

After the occurrences are measured and the summary created, block 316 depicts a correlation step where the occurrences and associated customer satisfaction scores are compared. This correlation is conducted by comparing two populations of data. The first population of data is represented by the calls where the selected occurrence was observed. The second population of data is represented by the calls where the selected occurrence was not observed. The customer satisfaction data for these two populations are compared to determine whether there is a statistically significant difference in customer satisfaction when the selected occurrence existed in a call compared to when the selected occurrence did not exist in a call.

By way of example, and not limitation, a simplified compiled log 109 may include 500 unique calls. Within these calls the occurrence of the prompt and response combination for "get account number—no input" may be measured. It may have been discovered that 70% of the calls did not experience this prompt and response combination, while the other 30% of calls did have this prompt and response combination. Furthermore, the customer satisfaction from the survey data may indicate that the same 70% of calls had a mean customer satisfaction score of 60% while the same 30% of calls had a mean customer satisfaction score of only 20%. These two data populations can be evaluated statistically to determine if the change in the customer satisfaction score is significant. If the change is significant, then one could identify this prompt and response combination as an area of the IVR for tuning. The objective here would be to modify the IVR to eliminate as many "no input" responses to the "get account number" prompt.

In the above example, it may be discovered by further examination of the IVR that the "get account number" prompt only allows ten seconds to input a response. For callers who may not know the account number without looking it up, the ten second timeframe may be inadequate, and thus cause the "no input" response. This may suggest modifying the IVR at this prompt to allow more time for a caller to provide a response, and/or possibly to change the prompt to allow a caller to input other acceptable information that the caller may have readily available, e.g. billing street address, in lieu of an account number. By making such modifications, one may surmise that the occurrences of "no input" at the "get account number" prompt would decrease and the overall mean customer satisfaction would increase. This fact of course could be verified in future analyses of a subsequent event log 99 and survey log 107.

Referring again now to the call path level analysis seen in FIG. 4, in block 412, the simplified compiled log 109 is analyzed to measure the occurrences, within each call, of the call paths and information associated with the call paths. This step may focus on collecting the occurrences for the call path prompts alone, regardless of the information associated with the call path, e.g. prompt responses or prompt results. For instance, the occurrences may be measured for a call path represented as "get account number→get zip code." In other embodiments this step may focus on collecting the occurrences for the call path prompts plus specific associated information. For instance, the occurrences may be measured for a call path represented as "get account number—no input→get billing address—accept." Still in other embodiments, this step may focus on collecting the occurrences for only the information associated with the call path prompts, but not the prompts themselves. For instance, the occurrences may be measured for a call path represented as "no input→accept." Those of ordinary skill in the art will appreciate that the measurement of occurrences may be structured to take any of a variety of forms as the above examples show.

FIG. 4 further includes a summary creation step as shown in block 414. The summary created in block 414 may include a breakdown of the occurrences measured for the call paths and information associated with the call paths. As will be discussed in further detail later, these summary statistics may be useful in certain aspects of the analysis, e.g. prioritizing the analysis results by weighting the analysis by frequency of the occurrence of a specific call path, etc.

After the occurrences are measured and the summary created, block 416 depicts a correlation step where the occurrences and associated customer satisfaction scores are compared. This correlation is conducted by comparing two populations of data. The first population of data is represented by the calls where the selected occurrence was observed. The second population of data is represented by the calls where the selected occurrence was not observed. The customer satisfaction data for these two populations are compared to determine whether there is a statistically significant difference in customer satisfaction when the selected occurrence existed in a call compared to when the selected occurrence did not exist in a call. It will be apparent from the above description that the correlating step of 416 is similar to the correlating step of 316. The distinction is that the occurrences associated with step 316 are for prompt level information while the occurrences associated with the step of 416 are for call path level information.

By way of example, and not limitation, a simplified compiled log 109 may include 500 unique calls. As a threshold matter, it may be decided that only call paths occurring in more than 2% of the calls will be analyzed. Within these calls the occurrences may be measured for the call path "get account number—no input→get billing street address—no match." It may have been discovered that 80% of the calls did not experience this call path, while the other 20% of calls did experience this call path. Furthermore, the customer satisfaction from the survey data may indicate that the same 80% of calls had a mean customer satisfaction score of 75% while the same 20% of calls had a mean customer satisfaction score of only 10%. These two data populations can be evaluated statistically to determine if the change in the customer satisfaction score is significant. If the change is significant then one could identify this call path as an area of the IVR for tuning. The objective here would be to modify the IVR to eliminate as many "get account number—no input→get billing street address—no match" call paths as possible.

In the above example, it may be discovered by further examination of the IVR that the "get account number—no input→get billing street address—no match" call path only allows ten seconds to input a response for the "get account number" portion of the call path. For callers who may not know the account number without looking it up, the ten second timeframe may be inadequate, and thus cause the "no input" response. This may suggest modifying the IVR at this portion of the call path to allow more time for a caller to provide a response, and/or possibly to change this portion of the call path to allow a caller to input other acceptable information that the caller may have readily available, e.g. account holder last name, in lieu of an account number. Additionally, it may be discovered that the "get billing street address" portion of the call path may only accept spoken responses. With street addresses being diverse and sometimes have multiple syllable words, it may be difficult for the associated speech recognition program to always accurately interpret a caller's response. Furthermore, if a caller calls from a noisy environment, the noise may interfere with the speech recognition program. This may suggest modifying the IVR at this portion of the call path to allow keypad entry of all or a portion of the billing street address. By making one or more of the above modifications, one may surmise that the occurrences of the "get account number—no input→get billing street address—no match" call path would decrease and the overall mean customer satisfaction would increase. This fact of course could be verified in future analyses of a subsequent event log 99 and survey log 107.

With respect to the correlation steps in blocks 316 and 416, it should be noted that statistical analysis computing software may be used and adapted to run the correlations for all the possible combinations of either prompts and/or their associated information, or call paths and/or their associated information. The use of a robust statistical analysis software ensures that each possible contributor to customer satisfaction is assessed. Furthermore, use of a robust statistical analysis software saves time and resources in that a system administrator is not required to specifically identify the desired combinations of either prompts and their associated information, or call paths and their associated information for the correlating steps.

In the analysis performed in blocks 316 and 416, a variety of statistical techniques may be employed to ensure that the relative contribution of each prompt is captured. For example, a combination of bivariate statistical techniques involving a computed Pearson correlation (where the formula is analogous to the phi coefficient in dichotomous cases) and chi-square tests may be used. Statistical techniques may, in addition or in the alternative, employ other approaches including computing a point biserial correlation coefficient, a Spearman's rank correlation coefficient, a Kendall tau rank correlation coefficient, and/or a Goodman and Kruskal's lambda. The variety of statistical techniques that may be employed to make the above correlations will be appreciated by those of ordinary skill in the art.

As alluded to above, the correlation analysis may be automated by using any suitable algorithm to conduct the statistical correlations. By way of example only, and not limitation, suitable algorithms for the analysis may include decision trees, SAS algorithms, a hidden Markov model (HMM), an artificial neural network (ANN), a Gaussian mixture model (GMM), and a k-means algorithm. Those skilled in the art will be able to appreciate other suitable algorithms for conducting the analysis of block 316.

Blocks 318 and 418 of FIGS. 3 and 4 respectively depict a step of weighting the correlations. The weighting step of 318, 418 may use the number of occurrences to identify how frequent a given prompt and associated information, or call path and associated information, occurs. This frequency may be used as a factor to adjust the relative importance when considering tuning opportunities based on the correlations alone. For example, if a specific prompt and response combination show a strong correlation to a low customer satisfaction score, but the specific prompt and response combination rarely occur, then the tuning opportunity for this combined prompt and response may take a lower priority compared to other prompt and associated information that occur more frequently yet may have weaker correlation to low customer satisfaction score.

Similarly, the weighting step may use a customer value engine (also called a lifetime value optimizer engine) such as described in U.S. patent application Ser. No. 11/686,812, entitled SYSTEM AND METHOD FOR CUSTOMER VALUE REALIZATION, filed Mar. 15, 2007, the disclosure of which is incorporated herein by reference. In an example here, the weighting step may use a customer value engine to provide more weight to survey responses from certain callers based on the caller's importance, or value to the company. By way of example only, and not limitation, the analysis program may be constructed to replicate important caller's responses by a certain factor such that the results will be more heavily weighted to such a caller's feedback. It should be understood that a customer value engine may be used for a variety of things, including, but not limited to, determining a customer's importance or priority. The caller's importance may be based on a variety of factors, such as the caller's net worth, the frequency of business transactions, or the amount of business the caller transacts with the company. Other factors for determining a caller's importance will be apparent to those skilled in the art.

Blocks 320 and 420 depict a step of identifying areas for IVR tuning based on the correlations and weighting steps of blocks 316, 318 and 416, 418. The identification of tuning opportunities in blocks 320, 420 may occur in a variety of forms. In one embodiment this identification of tuning opportunities occurs automatically. In such a scenario, a report may be automatically generated as an output of the statistical correlation analysis and sent to an IVR system administrator for review. The report may include a prioritized list of tuning opportunities based upon the correlation and weighting analysis described above. The report may be in graphical form or table form for easy viewing and interpretation by the IVR system administrator. In some versions, a prioritized list of tuning opportunities may use a rules format where the significant and prioritized results are shown as a set of rules. By way of example, and not limitation, a rule might include "more options—reject>0" along with an associated customer satisfaction score of 20. This rule would suggest that a significant difference in customer satisfaction score exists when a caller experiences a rejected response from the IVR at a "more options" prompt. And, based on the data set, the average customer satisfaction score will be 20 when a caller experiences a "reject" result at a "more options" prompt.

Figure 5:
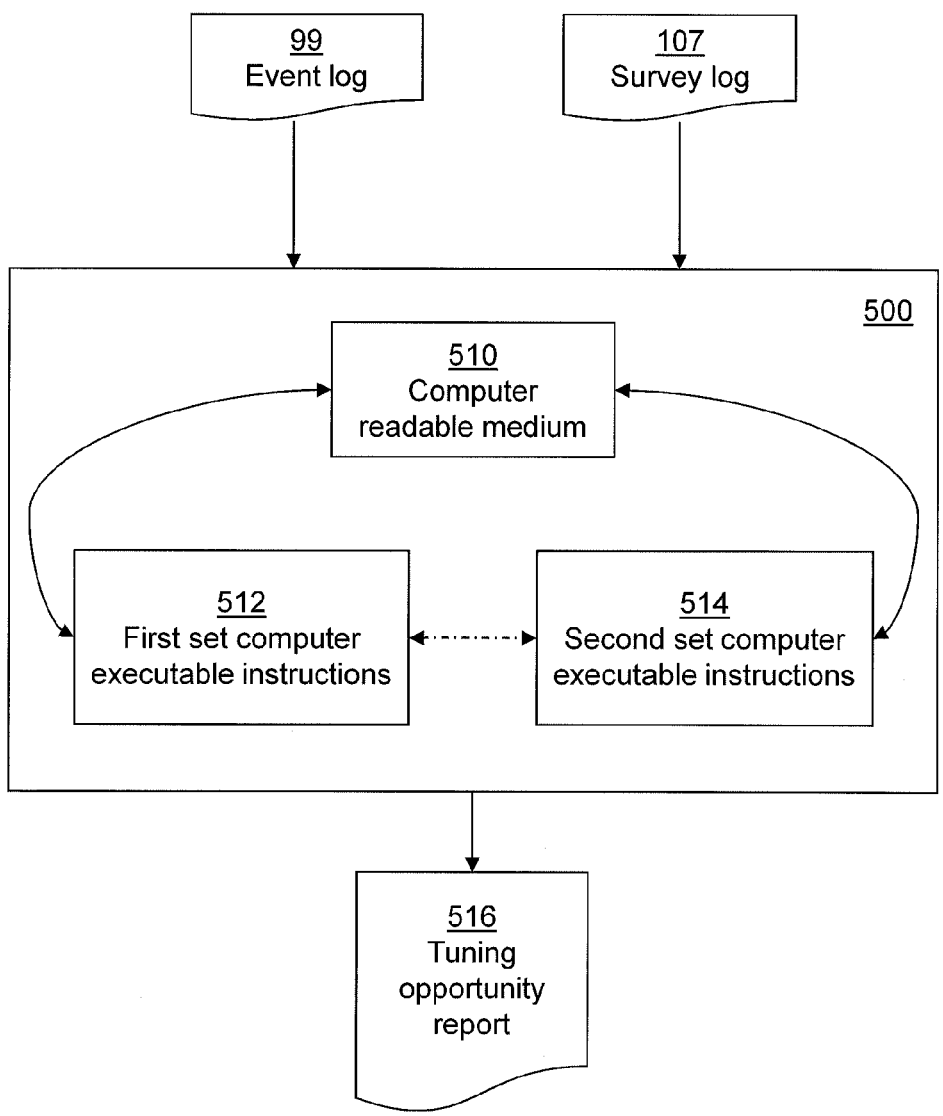
FIG. 5 represents an exemplary high-level diagram of a system that may be used with the methods disclosed herein.

Referring now to FIG. 5, a system for implementing an exemplary method is shown. An event log 99 and a survey log 107 are used in a computer system 500. The computer system 500 includes a computer readable medium 510, processor (not shown), and one or more user interface devices (not shown). The computer readable medium 510 is associated with a first set of computer executable instructions 512 and a second set of computer executable instructions 514. The output from computer system 500 may be a tuning opportunity report 516.

The first set of computer executable instructions 512 may be designed to store the event log 99 and survey log 107 in the computer readable medium 510. It will be appreciated that the first and second set of computer executable instructions 512, 514 may themselves be stored in the computer readable medium 510 or in any other suitable location. The second set of computer executable instructions 514 may be designed to merge the event log 99 and survey log 107 to produce the simplified compiled log 109 shown in the process step 124 of FIG. 1.

Furthermore, the first or second set of computer executable instructions 512, 514 may contain the algorithm used in the analysis steps shown in FIGS. 3 and 4. The computer executable instructions 512, 514 may be designed to use the algorithm to analyze the simplified compiled log 109 and generate a tuning opportunity report 516 identifying opportunities for improving the IVR application as shown in the process steps 320 and 420 of FIGS. 3 and 4 respectively.

It will be appreciated by those skilled in the art that a variety of computing designs including hardware and software components may be adapted to perform the disclosed methods. It will further be appreciated that the systems and methods may be implemented in both networked and non-networked environments. The above disclosed system as shown in FIG. 5 is merely one representation of such a system and is not intended to be limiting. For example, one or more computer readable mediums may be used when performing the methods. The computer readable mediums may operate with any suitable processor and user interfaces to execute the method steps of the computer executable instructions. Also, a suitable system may include numerous sets of computer executable instructions each designed to perform different steps of the methods disclosed. Alternatively, one set of computer executable instructions may be designed to perform all method steps. In addition, the algorithm for analyzing and detecting low caller satisfaction events may be completely automatic, and thus not require human supervision. In some versions, an automatic analysis approach such as this may be integrated into a live production IVR where it will detect issues with the application dynamically on a rolling basis and will raise alerts when low satisfaction events are detected. In other embodiments, the analysis conducted by the algorithm may be triggered manually by an IVR system administrator on a periodic or as needed basis.

Referring now to FIGS. 6-11, these figures show exemplary aspects of the system and method disclosed herein. While some aspects appearing in FIGS. 6-11 may be consistent among figures, not all aspects shown are intended to be consistent among the figures.

FIG. 6 shows an exemplary redacted processed event log 103 derived from an event log 99. As discussed above, the redacted processed event log 103 is derived by first processing the event log 99 to identify unique calls, and then limiting the data to main prompts. In this redacted processed event log 103, there are three exemplary dialog modules of an IVR represented. The caller first goes through a first dialog module, abbreviated by the dialog module number (DMNM) M0400. Then the caller goes through a second dialog module, abbreviated by the dialog module number M0280. Then the call goes through a third dialog module, abbreviated by the dialog module number M0440.

At the M0400 dialog module, a first state is started as represented by the data "EVNT=SWIstst." The next event down, "EVNT=SWIprst," indicates the start of a prompt. The prompt name (PRNM) is "INITIAL_PROMPT," and the prompt type (PRTX) is "m0400_initial.ulaw." The end of the prompt is represented by the data "EVNT=SWIendp." Furthermore, it is clear that there was no "barge in" that ended this prompt prematurely as shown by the data, "BRGN=0." The prompt response here is seen as "TRTT=open_24_hours." The caller provided this response by speech as captured by the data, "MODE=SPCH." The prompt result at this state (RDEC) is seen as "accept." At that point, there is also an end to the state as seen by the data "EVNT=SWIstnd." Finally, the dialog module result is provided by "TSTT=Success." In summary form, at the M0400 dialog module, the caller was provided the prompt abbreviated by m0400_initial.ulaw. The caller responded by voice, indicating the "open_24_hours" option. This response was accepted and this dialog module ended successfully.

The M0280 dialog module follows this same scheme. However, in this dialog module, it can be seen that the caller did not respond to the prompt as indicated by the data "MODE=Timeout." This is further evident by the prompt response (TRTT) not including any recorded data. In this dialog module example, only a single timeout was permitted before the entire dialog module is considered unsuccessful. As such, the dialog module result (TTST) is provided as "Max timeouts."

The third dialog module shown, M0440, shows that the caller provided a prompt response (TRTT) of "survey." This response was accepted as shown by "RDEC=accept." Also in this dialog module, the caller interrupted the prompt as seen by the data "BRGN=1."

FIG. 7 shows an exemplary survey log 107. In this survey log 107, there are three exemplary dialog modules of the IVR represented. Here, each dialog module in the survey represents a different survey question for the caller. In FIG. 7, a first dialog module pertains to a quality question, as seen in the abbreviated dialog module number A100_Quality. At the conclusion of the dialog module is the associated customer satisfaction score, in the example shown in FIG. 7 the customer satisfaction score is five (TRTT=5). The caller's response to the prompt here was accepted as seen by "RDEC=accept." Furthermore, this dialog module was successful as seen by "TSTT=Success."

A second dialog module pertains to how effectively the caller's question or problem was resolved, and is seen in the abbreviated dialog module number A100_Resolution_Navigation. In this dialog module, the caller interrupted the prompt type (PRTX) A100_resolution_navigation_initial_ulaw. After the interruption, a prompt result (RDEC) of "confirm" was given. Thus, the IVR then provided a prompt type (PRTX) of "you_said.ulaw." The caller here did not confirm the IVR's understanding as seen by "DCSN=Denied." The IVR then provided a wrong answer apology prompt and then replayed the original prompt type (PRTX) A100_resolution_navigation_initial_ulaw. In this second attempt, the caller responded with a customer satisfaction score is five (TRTT=5). The caller's response to the prompt here was accepted as seen by "RDEC=accept." Furthermore, this dialog module was successful as seen by "TSTT=Success."

A third dialog module pertains to an instructions questions, as seen in the abbreviated dialog module number A110_Front_End_Instructions and the prompt type (PRTX) of A110_front_end.ulaw. At the conclusion of the dialog module is the associated customer satisfaction score, in the example shown in FIG. 7 the customer satisfaction score is five (TRTT=5). Again, the caller's response to the prompt here was accepted as seen by "RDEC=accept." Furthermore, this dialog module was successful as seen by "TSTT=Success."

By way of example only, a quality question in a survey as shown by the survey log 107 of FIG. 7 may ask, "On a scale of 1 to 10 please rate the quality of your experience with this customer support application." Similarly, a resolution question may ask, "On a scale of 1 to 10 please rate how well this customer support application resolved your issue." Likewise, an instructions question may ask, "On a scale of 1 to 10 please rate the instructions given during this customer support application." The responses to these survey questions may be combined to form a single overall customer satisfaction score, e.g. the responses may be averaged to produce an overall statistic, however other calculating methods may be used to arrive at an overall customer satisfaction.

FIG. 8 shows an exemplary simplified compiled log 109 (albeit without the data aggregated to one-row per call due to printing space constraints). In FIG. 8, the redacted processed log 103 of FIG. 6 is merged with the survey log 107 of FIG. 7. The result of the merging of the two logs is a simplified compiled log 109. As discussed above, when creating the simplified call flow log 105 and ultimately the simplified compiled log 109, sometimes it may be beneficial to re-code relevant data for clarity and ease of analysis. However, such re-coding is not always required or necessary. In the example of FIGS. 6-8, the redacted processed event log 103 and simplified call flow log 105 were essentially synonymous such that creating the simplified compiled log 109 only required combining the data from the survey log 107. Referring to FIG. 8, the 3 dialog module exchanges of FIG. 6 appear at the top portion of FIG. 8, while the three dialog module exchanges for the survey from FIG. 7 appear at the bottom portion of FIG. 8. Again, where printing space limitations are not an issue, all the data represented in FIG. 8 would be shown in a single row format since the information is from a unique call.

FIG. 9 shows an exemplary data table 910 derived from a simplified compiled log 109. In some versions this data table may be referred to as a feature vector table. The data table 910 presents the information captured in the simplified compiled log 109 in a form suitable for further analysis by any suitable computer programming algorithm as discussed above. In the left-most column, FIG. 9 shows five different prompts represented in abbreviated numeric form: h1_a0210, h1_m0100, h1_m0113, h1_m0420, and h1_y0150. Also shown in the left-most column are the four different results for these prompts: present, accept, timeout, and reject. A series of twenty calls and their occurrences for the prompt and result combinations are shown in FIG. 9. A "0" in the table may represent that there was no occurrence for that caller for that specific prompt and result combination. Similarly, a "1" in the table may represent that there was at least one occurrence for that caller for that specific prompt and result combination. Additionally, the corresponding customer satisfaction score, from the initial survey log 107 and later recorded in the simplified compiled log 109, is shown for each call.

One exemplary analysis for the data table 910 of FIG. 9 may be conducted by creating two populations of data and then performing statistical significance testing. For example, one may focus on the prompt and result combination of h1_m0113 accept. The two populations here would be divided into (1) those that did not have this particular prompt and result combination and (2) those that did have this particular prompt and result combination. The customer satisfaction scores from these two populations would then be compared to determine if there was a statistically significant difference in the customer satisfaction score for these two populations. Those of ordinary skill in the art will appreciate that this example is merely a snapshot of the type of analysis that may be conducted.

Figure 10:
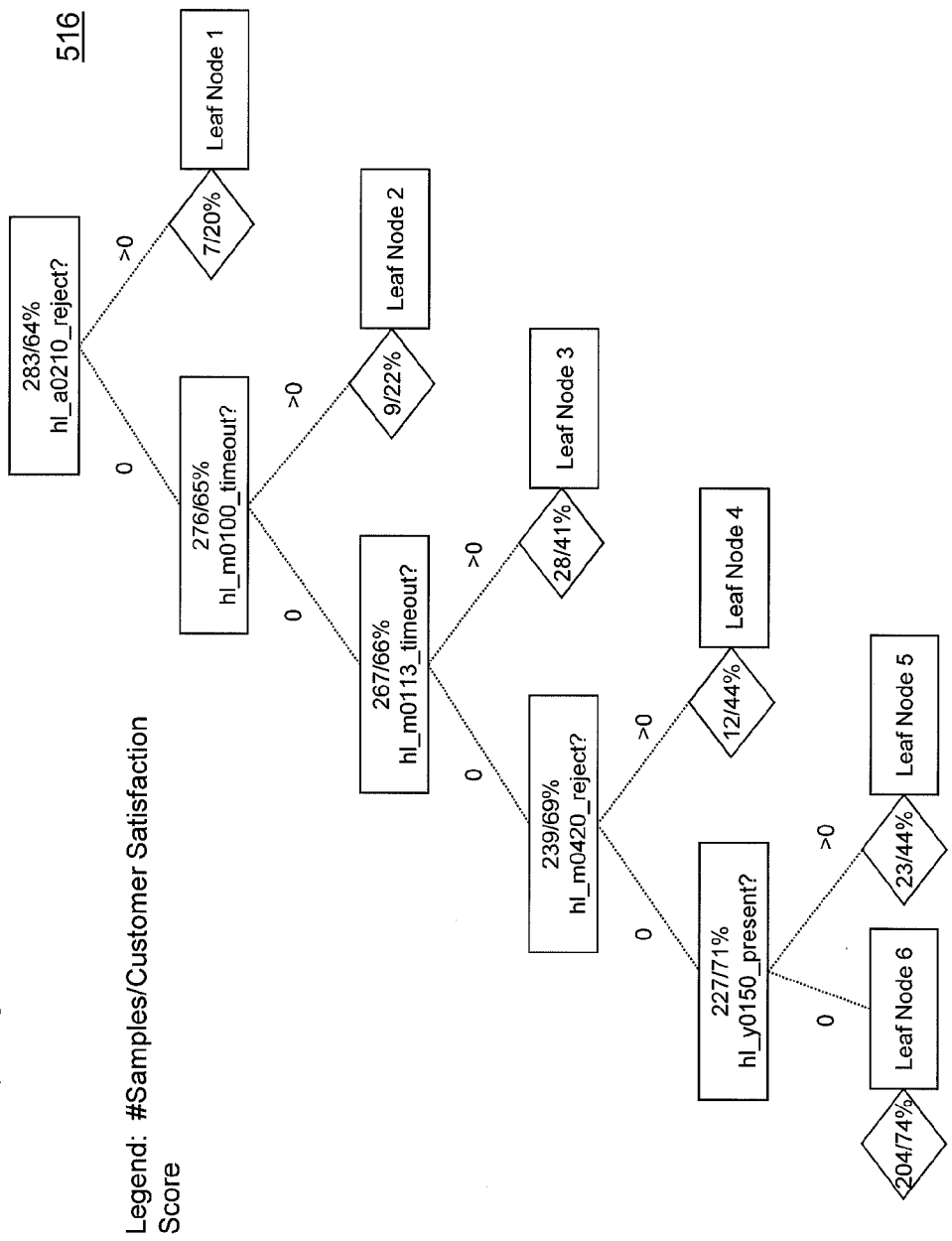
FIG. 10 depicts an exemplary tuning opportunity report in graphical form.

FIGS. 10 and 11 show exemplary tuning opportunity reports 516. FIG. 10 shows a graphical representation of a tuning opportunity report 516 from a decision tree analysis. As shown in FIG. 10, each leaf node represents a branch of the analysis for consideration. For example, at the top, of 283 callers, 7 experienced a reject result at the h1_a0210 prompt. The average customer satisfaction score for these 7 occurrences is 20%. Of the 276 remaining callers that continued to the h1_m0100 prompt, 9 experienced a timeout result at the h1_m0100 prompt. The average customer satisfaction score for these 9 occurrences is 22%. Continuing this progression, as shown in the report 516, compared to the customer satisfaction scores at the other leaf nodes, the customer satisfaction scores at leaf nodes 1 and 2 are the lowest and thus may represent potential tuning opportunities.

However, one must still consider the prioritization aspects, namely the fact that focusing on leaf nodes 1 and 2 only address 16 out of 283 callers—this is less than 6% of the callers. Arguably, it may have greater impact to improving overall customer satisfaction by focusing on the 28 callers (almost 10% of the callers) at leaf node 3 and trying to modify the IVR to prevent these callers from having a timeout at the h1_m0113 prompt. These prioritization decisions may be made in a variety of ways. For instance, such decisions may be made by a system administrator responsible for improving customer satisfaction with the IVR. In other examples, such prioritization occurs by rank ordering mathematically. Such mathematic rank ordering may take advantage of any number of rank ordering formulas which will be apparent to those of skill in the art. As discussed above some rank ordering factors may include the frequency of occurrences and the customer's value.

FIG. 11 shows an exemplary tuning opportunity report 516 in table format. The rules column in FIG. 11 contains rule statements that are associated with a customer satisfaction score. For example, the first row shows a customer satisfaction score (CSAT) of 7 from those experiencing a reject result at the h1_a0210 prompt. Also shown in FIG. 11 is the number of surveys used for calculating the average customer satisfaction score, as well as the node traffic. The node traffic metric may be helpful in weighting the customer satisfaction score when prioritizing tuning opportunity areas. For instance, a tuning opportunity may receive a lower priority where a rule is associated with a low node traffic percentage. This is because the low node traffic percentage means that few callers are experiencing the particular occurrence represented by the rule. Thus the greatest impact on improving customer satisfaction may be achieved by focusing on those areas showing relatively high node traffic with a relatively low customer satisfaction score.

In summary, numerous benefits have been described which result from employing the concepts disclosed herein. The foregoing description of one or more of the embodiments has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles and practical application of the disclosure to enable one of ordinary skill in the art to best utilize the various embodiments, with or without various modifications as are suited to a particular contemplated use. It is intended that the scope of the invention be defined by the claims appended hereto.

We claim:

1. An interactive voice response system comprising:
   a. a processor;
   b. a non-transitory computer readable medium comprising computer executable instructions to perform a method for improving customer satisfaction with a customer service application having a customer satisfaction survey, the method comprising:
      i. integrating a survey log with an event log to produce a simplified compiled log, wherein the survey log includes a customer satisfaction score for the customer service application based on one or more responses to the customer satisfaction survey, wherein the event log comprises customer service information for the customer service application;
      ii. analyzing a portion of the customer service information from the simplified compiled log to determine whether the portion of the customer service information is associated with a low customer satisfaction score;
      iii. creating a report, wherein the report includes a table having a list of portions of customer service information associated with low customer satisfaction scores, wherein the list is prioritized by the customer satisfaction score; and
      iv. creating a graph, wherein the graph includes a series of leaf nodes, wherein each leaf node represents an area of the customer service application associated with the customer satisfaction score, wherein the customer satisfaction score is based on an average of survey responses from a plurality of customers.

2. The computer readable medium of claim 1, wherein the customer satisfaction survey comprises one question associated with the customer satisfaction application.

3. The computer readable medium of claim 1, wherein the customer service information further comprises a dialog module result.

4. The computer readable medium of claim 1, wherein:
   a. the method comprises producing the event log by processing an unprocessed event log from the customer service application; and
   b. the act of analyzing the portion of the customer service information comprises creating a correlation comparing a first state where the portion of the customer service information was present in the unprocessed event log to a second state where the portion of the customer service information was not present in the unprocessed event log.

5. The computer readable medium of claim 4, wherein the method further comprises weighting the result of the correlation using occurrences of the portion of the customer service information.

6. The computer readable medium of claim 5, wherein the portion of the customer service information comprises a combined prompt type and prompt result.

7. The computer readable medium of claim 6, wherein the portion of the customer service information comprises a combined prompt type, prompt response, and prompt result.

8. The computer readable medium of claim 7, wherein the prompt result comprises a reject value, wherein the reject value indicates that the prompt response was not recognized by the customer service application.

9. The computer readable medium of claim 5, wherein the portion of the customer service information comprises a combined prompt type and prompt response.

10. The computer readable medium of claim 9, wherein the prompt response comprises a timeout.

11. The computer readable medium of claim 5, wherein the portion of the customer service information comprises a website path.

12. The computer readable medium of claim 1, wherein the act of processing the event log comprises:
    a. identifying contact timestamp information;
    b. identifying a customer service application name;
    c. creating a unique contact identifier for each contact;
    d. assigning the unique contact identifier to each contact; and
    e. grouping the contact information from the event log by the unique contact identifier.

13. The computer readable medium of claim 12, wherein the act of integrating the survey log with the event log comprises:
    a. creating a common unique contact identifier for the survey log and the event log; and
    b. matching the data from the survey log to the data from the event log, wherein the act of matching uses the common unique contact identifier.

14. A non-transitory computer readable medium comprising computer executable instructions to perform a method for improving customer satisfaction with a customer service application having a customer satisfaction survey, the method comprising:
    a. accessing events, and responses from a customer to the customer satisfaction survey, in one or more logs;
    b. correlating one or more prompts of the customer service application and the associated information with the matching responses to the customer satisfaction survey;
    c. weighting the responses from the customer satisfaction survey by a customer's value
    d. measuring occurrences of the one or more prompts of the customer service application and the associated information; and
    e. artificially increasing the occurrences by a factor commensurate with the customer's value prior to the act of correlating the one or more prompts and the associated information to the responses from the customer satisfaction survey;

wherein the method improves customer satisfaction by tuning an interactive voice system.

15. A non-transitory computer readable medium comprising computer executable instructions to perform a method for improving customer satisfaction with a customer service application having a customer satisfaction survey, the method comprising:
   a. integrating a survey log with the event log to produce a simplified compiled log, wherein the survey log includes a customer satisfaction score for the customer service application based on one or more responses to the customer satisfaction survey, wherein the event log comprises customer service information for the customer service application;
   b. identifying a portion of the customer service information from the simplified compiled log for analysis;
   c. analyzing a portion of the customer service information from the simplified compiled log to determine whether the portion of the customer service information is associated with a low customer satisfaction score, wherein the act of analyzing incorporates occurrences for the portion of the customer service information and the customer satisfaction score; and
   d. creating a graph, wherein the graph includes a series of leaf nodes, wherein each leaf node represents an area of the customer service application associated with the customer satisfaction score;

wherein the method improves customer satisfaction by tuning an interactive voice system.

16. The computer readable medium of claim 15 wherein the customer satisfaction score is based on an average of survey responses from a plurality of customers.

* * * * *